United States Patent Office 3,322,771
Patented May 30, 1967

3,322,771
INTERMEDIATES FOR PREPARING THEBAINE
DERIVATIVES
James Richard Bartels-Keith, Brookline, Mass., assignor to Smith Kline & French Laboratories, Philadelphia, Pa., a corporation of Pennsylvania
No Drawing. Continuation of application Ser. No. 313,793, Oct. 4, 1963. This application Nov. 3, 1966, Ser. No. 591,678
Claims priority, application Great Britain, Oct. 10, 1962, 38,444/62, 38,445/62
8 Claims. (Cl. 260—285)

This application is a continuation application of Ser. No. 313,793, filed Oct. 4, 1963.

This invention relates to new compounds which have utility as intermediates for preparing novel analgetically active thebaine derivatives which are described and claimed in the above-noted application. These compounds have the following structural formulae:

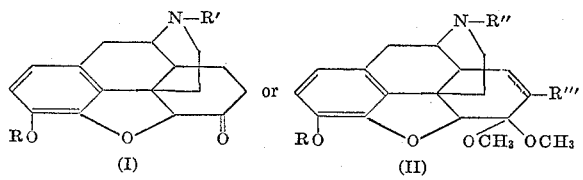

in which R is hydrogen, methyl or diethylcarbamyl; R' is cyano cyclopropylcarbonyl, cyclobutylcarbonyl, tert.-butoxycarbonyl, benzyloxycarbonyl and, when R is diethylcarbamyl, hydrogen; R" is cyclproylmethyl, cyclopropylcarbonyl, cyclobutylmethyl, cyclobutylcarbonyl, benzyloxycarbonyl or tert.-butoxycarbonyl; and R''' is, when ——— is a double bond, hydrogen or, when ——— is a single bond, bromo.

These intermediate compounds are all characterized by the thebaine structure having a keto group at the 6-position or a ketal derivative thereof. The O-carbamyl derivatives are of particular interest because of the unexpected stability of the carbamyl group toward acid.

The following examples are exemplary of the intermediates of this invention and their use in order to teach those skilled in the art the practice of this invention. They are not intended to restrict the scope of this invention thereto.

Example 1

To a solution of dihydronorcodeinone (3.80 g.) in dioxan (38 ml.) are added magnesium oxide (1.075 g.) and water (38 ml.). The mixture is stirred while a solution of t-butyl azidoformate (3.82 g.) in dioxan (15 ml.) is added dropwise. When addition is complete the pale orange mixture is maintained at 45–50° C. with stirring for 20 hours, then cooled in ice and filtered using a filtration aid. The filtrate is diluted with saturated aqueous sodium chloride (50 ml.) and water (50 ml.), extracted with ethyl acetate (3× 50 ml.). The combined ethyl acetate extracts are cooled to 4° C. and washed with ice-cold 10% aqueous citric acid (4× 15 ml.) followed by saturated aqueous sodium chloride (3× 10 ml.), dried over magnesium sulphate, and evaporated. The residue is taken up in chloroform and the turbid solution filtered using a filtration aid. Evaporation gives a gum which is crystallized from the minimum volume of hot ethanol giving large prisims, M.P. 151.5–152.5° C., of N(t-butoxycarbonyl)-dihydronorcodeinone.

Sodium (0.227 g.) is added to dry t-butanol (40 ml.) and dry methanol (0.8 ml.) and the mixture is heated under reflux in an atmosphere of dry nitrogen until dissolution is complete (45 minutes). Further dry t-butanol (20 ml.) is then added and the mixture is allowed to cool to room temperature. A soultion of N(t-butoxycarbonyl)-dihydronorcodeinone (3.17 g.) in dry dioxan (30 ml.) is then added dropwise with stirring under dry nitrogen giving an almost clear yellow solution. A solution of dimethyl sulphate (1.14 g.) in dry t-butanol (15 ml.) is then added dropwise with stirring, after which the mixture is stirred for one hour at room temperature and then for two hours under reflux. Finally the solvents are removed under reduced pressure and the residue stirred with 1.5% aqueous ammonium hydroxide for ten minutes. The sticky white solid is collected, washed with water, and dried. The crude product (3.26 g.) is dissolved in dry benzene and subjected to chromatography on activated alumina (53 g.; type H). Elution with benzene gives a foam which crystallized on treatment with light petroleum (B.P. 60 to 80° C.) giving a product M.P. 163–166° C. (1.63 g.). Recrystallization from ethanol gives pure N(t-butoxycarbonyl) - $\Delta^6$ - dihyronorthebaine, needles, M.P. 168–169° C.

N(t-butoxycarbonyl)-$\Delta^6$-dihydronorthebaine (0.900 g.) is dissolved in a mixture of ethanol-free chloroform (11.5 ml.) and anhydrous methanol (45 ml.), and finely divided magnesium oxide (0.073 g.) is added. The mixture is cooled in an ice-bath and stirred vigorously while bromine vapour (from 0.375 g. of bromine in a small flask) is drawn through the mixture by means of a slow stream of dry air (dried by passage through concentrated sulphuric acid), using an aspirator pump. The rate of addition of bromine is such that the reaction mixture remains colorless throughout the addition, which takes 1.5 hours. When addition is complete the mixture is stirred for a further 20 minutes after which the residual magnesium oxide is removed using a filtration aid and washed with cholorform. Evaporation of the filtrate and washings give a residue which solidifies when cooled in ice and rubbed with water. The solid is collected, washed with water, and dried. The crude product (1.27 g.) dissolves rapidly in light petroleum (B.P. 60 to 80° C.), leaving an insoluble residue which is collected using a filtration aid and washed with light petroleum (B.P. 60 to 80° C.). Evaporation of the clear filtrate and washings gives 7-bromo-N(t-butoxycarbonyl)dihydronorcodeinone dimethyl ketal as a white foam which gives analytically pure material on intensive drying in a vacuum.

Potassium (0.048 g.)i s dissolved in dry 2-methyl-2-butanol (10 ml.) under reflux. The resulting alkoxide solution is distilled through a short (15 cm.) Vigreux column, dry toluene being added at a rate sufficient to keep the volume of the mixture constant. Distillation is continued until the distillate consists of pure toluene (as indicated by the temperature of distillation).

The apparatus is then reconverted for reflux and a solution of 7-bromo-N(t-butoxycarbonyl)dihydronorcodeinone dimethyl ketal (0.306 g.) in dry toluene (5 ml.) is added to the potassium alkoxide solution and rinsed in with further toluene (10 ml.). The mixture is then heated under reflux in an atmosphere of dry nitrogen for 24 hours, after which the reaction mixture is cooled and treated with saturated aqueous sodium chloride (20 ml.) and the aqueous layer extracted with ethyl acetate (2× 15 ml.). The combined toluene and ethyl acetate phases are washed with saturated aqueous sodium chloride (10 ml.), dried over magnesium sulphate, and evaporated. The resulting brown foam (0.234 g.) is taken up in methanol and the flocculent insoluble material collected using a filtration aid and washed with methanol. Evaporation gives a residue which largely dissolves in light petroleum; the small amount of insoluble material is removed in the same manner as before, and the filtrate and washings are evaporated giving N(t-butoxycarbonyl)norcodeinone dimethyl ketal as a pale orange foam.

Repetition of this preparation on a larger scale using substantially the same procedure (1.06 g. of the foregoing bromo-ketal, dissolved in 25 ml. of dry toluene, added to an alkoxide solution, of volume 20 ml., prepared using 0.163 g. of potassium) gives a product which is shown by spectroscopic analysis to be a mixture of N(t-butoxycarbonyl)norcodeinone dimethyl ketal and N(t-butoxycarbonyl)northebaine.

A Soxhlet extraction apparatus is set up with toluene-p-sulphonic acid monohydrate (0.301 g.) and chloroform (500 ml.) in the boiling flask and a thimble (28 x 80 mm.) filled with activated calcium sulphate in the extractor. The mixture in the flask is heated under vigorous reflux for 1.5 hours, after which time the contents of the thimble have removed all the water present in the mixture.

The solution of anhydrous toluene-p-sulphonic acid so obtained is cooled to 20° C. and a solution of N(t-butoxycarbonyl)norcodeinone dimethyl ketal [3.40 g.; containing some N(t-butoxycarbonyl)northebaine] in chloroform (70 ml.) is added to the stirred solution. Stirring is continued for a further two hours at 20° C. after which the solution is poured into a mixture of 14% aqueous potassium carbonate solution (350 ml.) and 10% aqueous ammonium hydroxide (100 ml.), shaken, and the chloroform layer dried over magnesium sulphate in the presence of sodium bicarbonate and evaporated, giving a brown foam. The crude product is stirred vigorously with successive portions of light petroleum (5× 80 ml.) and the combined extracts are evaporated giving a straw-colored foam which is taken up in dry benzene and subjected to chromatography on activated alumina (160 g.; type H). Elution with benzene and evaporation of the eluates give N(t-butoxycarbonyl)northebaine as a pale orange-yellow foam.

A solution of anhydrous toluene-p-sulphonic acid, prepared from toluene-p-sulphonic acid monohydrate (2.66 g.) and ethanol free chloroform (420 ml.; containing about 1% by weight of methanol) is stirred at room temperature while N(t-butoxycarbonyl)northebaine (1.38 g.) dissolved in chloroform (30 ml.) is added. Stirring is continued while the mixture is heated in a water-bath to 47–50° C. during half an hour and the temperature maintained at 47–50° C. for a further 2.5 hours. The mixture is then cooled in ice, poured into a mixture of saturated aqueous sodium carbonate (150 ml.) and 10% aqueous ammonium hydroxide (50 ml.), well shaken, and the chloroform layer washed with saturated aqueous sodium carbonate (3× 50 ml.), dried over magnesium sulphate, and evaporated, giving a greenish-brown foam.

This product is dissolved in a mixture of ethyl acetate and ethanol-free chloroform (25 ml.; 1:1), and the solution placed in a separatory funnel and treated portionwise with a mixture of trifluoroacetic anhydride (2.5 ml.) and ethyl acetate (7.5 ml.), with shaking after each addition. When all the reagent has been added the mixture is washed with saturated aqueous potassium bicarbonate (50+20 ml.) and then with saturated aqueous sodium chloride (2× 10 ml.), dried over magnesium sulphate, and evaporated, giving a brown foam. This product is taken up in dry benzene and subjected to chromatography on activated alumina (150 g.; type H). Elution with benzene and evaporation of the eluate give N(trifluoroacetyl)northebaine as a yellow oil.

N-(trifluoroacetyl)northebaine (0.109 g.) is dissolved in a mixture of acetone (3.5 ml.) and methanol (10.5 ml.) and the mixture stirred at 25° C. while 2 N-sodium hydroxide (1.40 ml.) is added dropwise. Stirring is continued for four hours, the temperature being maintained at 20–25° C. Ten percent aqueous citric acid (14 ml.) is then added slowly with continued stirring, and the mixture, after dilution with water (14 ml.), extracted with ether (3× 20 ml.). The aqueous phase, which had pH 3, is stirred rapidly while 10 N-sodium hydroxide (10 ml.) is added dropwise. The mixture, which now is at pH 11, is extracted with chloroform (3× 20 ml.) and the combined chloroform extracts dried over magnesium sulphate and evaporated, giving northebaine as an almost colorless gum.

A solution of northebaine (0.047 g.) in ether (2 ml.) is filtered to remove a small amount of insoluble material. The filtrate on evaporation gives a product (0.044 g.) which is redissolved in ether (7 ml.), and the resulting solution added slowly with shaking to a solution of salicylic acid (0.016 g.) in ether (2 ml.). The resulting opalescent suspension is evaporated, with gentle warming, to about 2 ml. whereupon the product crystallizes. The mixture is left overnight at 0° C. after which the solid is collected and washed with ether giving the salicylate salt of northebaine, M.P. 189–190° C. (decomp.). Recrystallization from ethanol gives the pure salt as crusts, M.P. 192.5–193.5° C. (decomp.).

A solution of allyl bromide (0.058 g.) in ethanol (1 ml.) is added to a mixture of northebaine (0.136 g.) and finely powdered sodium bicarbonate (0.057 g.). The mixture is diluted with further ethanol (1 ml.) and is then heated under reflux with stirring for 21 hours. The resulting mixture is diluted with methanol (3 ml.) and the solids removed and washed with methanol using a filtration aid. The filtrate and washings are evaporated giving a brownish residue which is extracted with boiling ether (2× 4 ml.). The ether-insoluble residue is digested with hot benzene (4× 2 ml.) and the benzene digests filtered using a filtration aid; the filtrate on evaporation gives a brown gum. This product is digested with cold benzene (5× 2 ml.) and the benzene digests filtered as above, giving, on evaporation of the filtrate, a pale brown foam which is taken up in dry benzene and subjected to chromatography on activated alumina (2.08 g.; type H). Elution with benzene and evaporation of the eluate gives a residue (0.044 g.) which is taken up in light petroleum. A trace of whitish residue is removed using a filtration aid, and the filtrate is evaporated giving N-allylnorthebaine as an almost colorless gum.

*Example 2*

N-cyclopropylmethyl-$\Delta^6$-dihydronorthebaine (6.00 g., prepared as in Example 3) is dissolved in anhydrous methanol (425 ml.), and finely divided magnesium oxide (0.54 g.) is added. The mixture is cooled in an ice-bath and stirred vigorously while bromine vapour (from 2.78 g. of bromine in a small flask) is drawn through the mixture by means of a slow stream of dry air (dried by passage through concentrated sulphuric acid), using an aspirator pump. The rate of addition of bromine is such that the reaction mixture remains colorless throughout the addition, which takes 2.5 hours. When the addition is complete the mixture is stirred for a further 15 minutes, after which the residual magnesium oxide is removed using a filtration aid and washed with mehanol. Evaporation of the filtrate and washings gives a residue which is dissolved in ethyl acetate (100 ml.) and shaken with saturated aqueous sodium carbonate solution (100 ml.). The aqueous layer is extracted with further ethyl acetate (250 ml.+100 ml.), and the combined ethyl acetate phases are washed with saturated aqueous sodium chloride (50 ml.), dried over magnesium sulphate, and evaporated. The residue is crystallized from the minimum volume of light petroleum giving prisms, M.P. 109–110° C. of 7-bromo-N-cyclopropylmethyldihydronorcodeinone dimethyl ketal. The mother-liquors deposit further material, M.P. 106–107° C. The compound is polymorphic, and can also be obtained as massive prisms, M.P. 112–113° C. from light petroleum.

When, in the above preparation, the residue from evaporation of the reaction mixture is treated with water and collected, there is obtained 7-bromo-N-cyclopropylmethyldihydronorcodeinone dimethyl ketal hemibromide (0.625 g. from 0.707 g. of the starting material), from which on recrystallization from ethyl acetate is obtained as prisms, M.P. 244–246° C. (decomp.), $[\alpha]_D^{24.3}$ −35° (c., 0.400 in chloroform).

Potassium (0.337 g.) is dissolved in dry 2-methyl-2-butanol (40 ml.) under reflux and the resulting alkoxide solution distilled through a short (15 cm.) Vigreux column, dry toluene being added at a rate sufficient to keep the volume of the mixture constant. This process is continued until the distillate consists of pure toluene (as indicated by the temperature of distillation; about 150 ml. of toluene is required).

The apparatus is now reconverted for reflux and a solution of 7-bromo-N-cyclopropylmethyldihydronorcodeinone dimethyl ketal (2.00 g.) in dry toluene (25 ml.) is added to the potassium alkoxide solution. The mixture is then heated under reflux in an atmosphere of dry nitrogen for 24 hours, after which the reaction mixture is cooled and treated with water (25 ml.) and the aqueous layer extracted with ethyl acetate (2× 25 ml.). The combined toluene and ethyl acetate phases are washed with saturated aqueous sodium chloride (2× 10 ml.), dried over magnesium sulphate, and evaporated. The brown oil so obtained is dissolved in dry tetrahydrofuran (75 ml.) and the solution added to a stirred slurry to lithium aluminum hydride (1.0 g.) in dry tetrahydrofuran (60 ml.). The mixture is heated under reflux with stirring in an atmosphere of dry nitrogen for 1.5 hours, and then allowed to stand overnight at room temperature. The resulting mixture is decomposed by dropwise addition first of ethyl acetate (5 ml.) and then of water (3 ml.). The precipitate is collected using a filtration aid and washed with ethyl acetate (5× 20 ml.). Evaporation of the filtrate and washings gives a syrup which is taken up in methanol (5 ml.) and the insoluble material collected on a filtration aid and washed with the minimum quantity of methanol. Evaporation of the filtrate and washings gives a residue which is taken up in light petroleum and the small amount of insoluble material removed in the same manner as before. Evaporation of the filtrate and washings gives N-cyclopropylmethylnorcodeinone dimethyl ketal as an almost colorless, viscous syrup.

A Soxhlet extration apparatus is set up with toluene-p-sulphonic acid monohydrate (5.95 g.) and chloroform (480 ml.) in the boiling flask and a thimble (27× 100 mm.) filled with activated calcium sulphate in the extractor. The mixture in the flask is heated under vigorous reflux for two hours, after which time the contents of the thimble have removed all the water present in the mixture.

The solution of anhydrous toluene-p-sulphonic acid so obtained is cooled to room temperature (20–25° C.) and a solution of N-cyclopropylnorcodeinone dimethyl ketal (3.01 g.) in chloroform (15 ml.) is added with stirring. The last traces of ketal are rinsed in with further chloroform (15 ml.). Stirring is continued while the mixture is heated in a water-bath to 47–50° C. during half an hour and the temperature maintained at 47–50° C. for a further one hour. The mixture is then cooled in ice, poured into a mixture of 10% aqueous ammonium hydroxide (60 ml.) and saturated aqueous sodium hydrogen carbonate (120 ml.) well shaken (whereupon the precipitate initially formed in the aqueous phase redissolves), and the chloroform layer is separated and washed with saturated aqueous sodium hydrogen carbonate (3× 70 ml.), dried over magnesium sulphate, and evaporated under reduced pressure, giving a brown product, N-cyclopropylmethylnorthebaine.

*Example 3*

Dihydronorcodeinone (21.0 g.) is dissolved in dioxan (211 ml.) and treated with water (21 ml.) and anhydrous potassium carbonate (21.1 g.). To the stirred mixture is added, dropwise, cyclopropylcarbonyl chloride (14.81 g.), during a period of 45 minutes. Stirring is continued for a further three hours at room temperature, after which the mixture is poured into water (1100 ml.). The resulting suspension is made alkaline to pH 11 with 2 N-sodium hydroxide and extracted with chloroform (200 ml., followed by 2 portions of 100 ml.). The combined chloroform extracts are washed with N-hydrochloric acid (150 ml.) and with water (150 ml.) and dried over magnesium sulphate. Evaporation of the dried extracts under reduced pressure gives a pale brown viscous oil which crystallizes when rubbed with ether giving prisms of N-cyclopropylcarbonyldihydronorcodeinone (23.70 g.), M.P. 140–141° C. Recrystallization from ethanol-ether gives needle clusters, M.P. 143–144° C. The product can also be recrystallized from ethyl acetate—light petroleum or from isopropanol-ether—light petroleum.

The purified material has $[\alpha]_D^{23°}$ —295° (c., 0.440 in chloroform).

Sodium (1.67 g.) is added to dry t-butanol (300 ml.) and dry methanol (4.5 ml.) and the mixture heated under reflux in an atmosphere of dry nitrogen until all the metal has dissolved. The resulting mixture is allowed to cool to room temperature and further t-butanol (105 ml.) is added. The solution so obtained is stirred (still in an atmosphere of nitrogen) while N-cyclopropylcarbonyldihydronorcodeinone (21.0 g.), dissolved in dry t-butanol (250 ml.), is added in a steady stream, giving an almost clear yellow solution. A solution of dimethyl sulphate (8.3 g.) in dry t-butanol (85 ml.) is then added dropwise with stirring, after which the mixture is stirred for one hour at room temperature and then for two hours under reflux. Finally the bulk of the solvent is removed under reduced pressure and the residue stirred for 15 minutes with dilute aqueous ammonia (51 ml. of 0.880 aqueous ammonia diluted to 840 ml. with water). The mixture so obtained is extracted with chloroform (400 ml.+ 2× 100 ml.). The combined chloroform extracts are washed with water, dried and evaporated. The residue is taken up in dry benzene and subjected to chromatography on activated alumina (400 g.; type H). Elution with benzene gives a foam which crystallizes on treatment with ether, giving N-cyclopropylcarbonyl-$\Delta^6$-dihydronorthebaine, M.P. 134–135° C. The M.P. is unchanged on recrystallization from benzene-light petroleum.

To a suspension of lithium aluminum hydride (3.0 g.) in dry tetrahydrofuran (150 ml.) is added a solution of N-cyclopropylcarbonyl-$\Delta^6$-dihydronorthebaine (6.0 g.) in dry tetrahydrofuran (225 ml.). The mixture is heated under reflux with stirring for three hours in an atmosphere of dry nitrogen; then the mixture is cooled in an ice bath, decomposed by the dropwise addition, with stirring, of a mixture of ethyl acetate (30 ml.) and ether (30 ml.), followed by cautious, dropwise addition of water (9 ml.). The gelatinous precipitate is collected using a filtration aid and washed with ethyl acetate (300 ml.). The combined filtrate and washings are evaporated to dryness to give a gum (5.5 g.), a portion of which crystallizes when cooled and rubbed with light petroleum. The remainder of the product when dissolved in the minimum volume (about 4 ml. per gram) of methanol and seeded with the foregoing crystalline material gives rectangular tablets or rods of N-cyclopropylmethyl-$\Delta^6$-dihydronorthebaine, M.P. 112.5–113° C., $[\alpha]_D^{26.5}$ —270° (c., 0.432 in chloroform).

A solution of N-cyclopropylmethyl-$\Delta^6$-dihydronorthebaine (2.0 g.) in methanol (100 ml.) is cooled to 0° C. and stirred while a solution prepared by diluting 3.734 N-hydrobromic acid (1.52 ml.) with methanol (20 ml.) is added dropwise. The resulting mixture is diluted with benzene (50 ml.) and evaporated under reduced pressure. Further benzene (50 ml.) is added to the residue and the mixture re-evaporated. The crystalline residue is recrystallized from acetone-methanol (1:1) to give the hydrobromide as rods, M.P. 270–272° C. (decomp.).

An aliquot of this product (500 mg.) in ethanol is reacted with an excess of ethylenechlorohydrin to give the quaternary salt.

*Example 4*

Benzyl chloroformate (4.57 g.) is added dropwise with vigorous stirring to a mixture of dihydronorcodeinone (5.74 g.), potassium carbonate (5.73 g.), and water (5.7 ml.) during a period of 30 minutes. The resulting mixture is stirred for two hours at room temperature and then poured into water (300 ml.) containing 2 N-sodium hydroxide (5 ml.). The resulting oily suspension is extracted with chloroform (200+ 2× 100 ml.) and the combined extracts washed with 2 N-sodium hydroxide (2× 50 ml.), 2 N-sulphuric acid (2× 50 ml.), water (50 ml.), and finally with saturated aqueous sodium bicarbonate (50 ml.), and finally with saturated aqueous sodium bicarbonate (50 ml.), then dried over magnesium sulphate. Evaporation of the dried extracts gives a yellow glass (9.94 g.) which is dissolved in absolute ethanol (75 ml.) to which acetic acid (7.5 g.) has been added. To the resulting solution is added Girard's reagent P (6 g.) and the mixture is heated under reflux for one hour. The reaction mixture is then cooled and poured into ice-water (500 ml.) containing 0.5 N-sodium hydroxide (225 ml.) and the neutral solution extracted with ether (4× 100 ml.). The aqueous phase is treated with 6 N-sulphuric acid (80 ml.) and set aside for one hour after which the resulting oily suspension is extracted with chloroform (3× 100 ml.). The combined chloroform extracts are washed with water (2× 100 ml.), saturated aqueous sodium bicarbonate (50 ml.), and finally again with water (100 ml.), dried over magnesium sulphate, and evaporated. Pure N-(benzyloxycarbonyl)dihydronorcodeinone is thus obtained as a white foam.

Sodium (0.515 g.) is added to a mixture of dry methanol (1.5 ml.) and dry t-butanol (94 ml.) and the mixture heated under reflux with stirring in an atmosphere of dry nitrogen until dissolution of the metal is complete. The reaction mixture is then cooled to room temperature and diluted with further dry t-butanol (47 ml.). With continued stiring and passage of nitrogen, a solution of N-(benzyloxycarbonyl)dihydronorocodeinone (7.85 g.) in dry t-butanol (47 ml.) is added; to the yellow solution so obtained is added, dropwise, a solution of dimethyl sulphate (2.60 g.) in dry t-butanol (23 ml.). During this addition a fine precipitate appears. The mixture is stirred at room temperature for a further hour and then under reflux (still under nitrogen) for 2 hours. Finally the bulk of the solvent is removed under reduced pressure and the residue is stirred with 1.5% aqueous ammonium hydroxide (300 ml.) and saturated aqueous sodium chloride (50 ml.), extracted with chloroform (100+ 2× 50 ml.), and the combined chloroform extracts washed with water (150 ml.), dried (magnesium sulphate), and evaporated. The yellow form (8 g.) so obtained is purified by chromatography on alumina (type H; 220 g.); elution with benzene and evaporation of the eluate gave pure N-(benzyloxycarbonyl)-$\Delta^6$-dihydronorthebaine as a white form (4.30 g.).

To N-(benzyloxycarbonyl)-$\Delta^6$-dihydronorthebaine (17.9 g.) is added triethylsilane (19.5 g.), triethylamine (0.23 ml.), and palladium chloride (200 mg.). The mixture is heated under reflux with stirring. After 1.5 hours further triethylamine (0.13 ml.) and palladium chloride (100 g.) are added, and heating with stirring continued for a further 2 hours. The reaction mixture is then cooled and the solids separated using a filtration aid and washed with warm dioxan (about 20 ml.). The filtrate and washings are treated with methanol (70 ml) and after 10 minutes the mixture is poured into ice-cold 10% aqueuos citric acid solution (900 ml.). The mixture so obtained is extracted with ether (3× 400 ml), and the aqueous layer cooled in ice, made alkaline by cautious addition of 50% aqueous sodium hydroxide (400 ml.), extracted with chloroform (3× 250 ml.), and the combined chloroform extracts washed with water, dried, and evaporated. The residue on cautious treatment with ether, followed by addition of an equal volume of light petroleum gives a crystalline solid M.P. 148.5–149.5° C. 9.7 grams of this crude product on recrystallization from ethyl acetate gives $\Delta^6$-dihydronorthebaine as large prisms, M.P. 152–152.5° C. A second crop M.P. 151–152.5° C. is obtained from the mother-liquors.

$\Delta^6$-dihydronorthebaine (6.00 g.) is dissolved in anhydrous methanol (600 ml.), and finely divided magnesium oxide (0.638 g.) added. The mixture is cooled in ice and stirred vigorously while bromide vapour (from 3.241 g. of bromine) is introduced in a current of dry air by the method used in the preparation of the N-cyclopropylmethyl analogue. After addition of the bromine, which takes 2 hours, the mixture is stirred for a further 15 minutes at 0° C. and then for 2 hours at room temperature. The residual magnseium oxide is then removed using a filtration aid and washed with methanol, and the filtrate and washings taken to dryness. The residue is treated with water (100 ml.), followed by saturated aqueous sodium carbonate (50 ml.), and the mixture extracted with chloroform (3× 100 ml.). The combined chloroform extracts are washed with water, dried, and evaporated, to give 7-bromodihydronorcodeinone dimethyl ketal as a white form.

Potassium (1.41 g.) is dissolved in dry 2-methyl-2-butanol (160 ml.) under reflux and the resulting alkoxide solution distilled through a 30 cm. Vigreux column, dry toluene being added at a rate sufficient to keep the volume of the mixture constant. This process is continued until the distillate consists of pure toluene (as is indicated by the temperature of distillation).

The apparatus is then re-converted for reflux and a solution of 7-bromodihydronorcodeinone dimethyl ketal (7.40 g.) in dry toluene (50 ml.) is added in one portion. The mixture is then stirred under reflux in an atmosphere of dry nitrogen for a further 23 hours, then cooled and treated with saturated aqueous sodium chloride (100 ml.). The aqueous phase is separated and extracted with ethyl acetate (2× 100 ml.), and the combined toluene and ethyl acetate phases washed repeatedly with saturated aqueous sodium chloride until the aqueous washings have a pH value of less than 9, dried, and evaporated, giving a gum (6.1 g.). This product is taken up in methanol and a trace of flocculent material removed using a filtration aid and washed with methanol. Evaporation of the filatrate and washings and dissolution of the residue in ether gives a solution which on dilution with light petroleum deposits a brown gum. The filtrate after removal of this gum is diluted with further light petroleum, seeded with pure norcodeinone dimethyl ketal (see below), and allowed to stand at 0° C. for 3 days. Collection gives norcodeinone dimethyl ketal as gummy crystals, M.P. 99–100° C. (1.90 g.). Further material, M.P. 91–97° C. (0.89 g.) is obtained by evaporating the mother liquors to dryness and crystallizing the residue from benzene-light petroleum; evaporation of the mother-liquors from this second crystallization gives a semi-crystalline residue. All these fractions are shown by infrared spectroscopy to consist of norcodeinone dimethyl ketal contaminated by a small proporation of northebaine which could not be removed by crystallization.

Pure norcodeinone dimethyl ketal is obtained from a small-scale dehydrobromination, starting from 0.207 g. of the bromo-ketal. Isolation as described above gives a gum (0.160 g.) which is crystallized from 1:1 ether-light petroleum giving the pure ketal as fine cream-colored needles, M.P. 104–106° C. (0.107 g.).

A mixture of norcodeinone dimethyl ketal (3.29 g.; containing a small proportion of northebaine), finely powdered sodium bicarbonate (1.26 g.) allyl bromide (1.24 g.), and absolute ethanol (40 ml.) is heated under reflux with stirring for 22.5 hours. The mixture is cooled and the solids removed and washed with methanol. Evaporation of the filtrate and washings gives a gum which largely dissolves on addition of light petroleum, leaving a residue which is collected using a filtration aid and washed with further light collected using a filtration aid and washed with further light petroleum. Evaporation of the filtrate and washings gives crude N-allylnorcodeinone dimethyl ketal (3.329 g.) as an orange oil which is used directly for the next step.

A Soxhlet extraction apparatus is set up with toluene-p-sulphonic acid (6.80 g.) and chloroform (500 ml.) in the boiling flask and a thimble (28 x 80 mm.) filled with anhydrous magnesium sulfate in the extractor. The mixture in the flask is heated under vigorous reflux for 2 hours, and then cooled to 20–25° C.

A solution of N-allylnorcodeinone dimethyl ketal (3.27 g.) in chloroform (50 ml.) is then added to the foregoing solution of anhydrous toluene-p-sulphonic acid, and the mixture stirred while the temperature is raised to 47–50° C. during half an hour, maintained at 47–50° C. for a further half hour, cooled in ice, and finally poured into a mixture of 10% aqueous ammonium hydroxide (60 ml.) and saturated aqueous sodium bicarbonate (150 ml.), well shaken, and the chloroform layer separated and washed with saturated aqueous sodium bicarbonate (3×70 ml.), dried, and evaporated under reduced pressure, giving a brown gum. This product is purified by chromatography on alumina (60 g.; type H); elution with benzene and evaporation of the eluate gives a residue which largely dissolves on treatment with light petroleum. The insoluble material is removed using a filtration aid and washed with light petroleum and the filtrate and washings evaporated giving N-allylnorthebaine base as a pale yellow syrup.

*Example 5*

Dihydromorphinone base (52.33 g.), acetic acid (131 ml.), and acetic anhydride (131 ml.) are heated together under reflux for 1.25 hours. The reaction mixture is then cooled in ice and treated with an excess of saturated aqueous sodium carbonate, and the product isolated by extraction with chloroform (3×150 ml.). The combined chloroform extracts are washed with 2 N-sodium hydroxide (200 ml.) and then with saturated aqueous sodium chloride (2×200 ml.), dried (magnesium sulphate) and evaporated. The resulting foam crystallizes on treatment with a mixture of light petroleum and ethyl acetate, giving prisms, M.P. 121–122.5° C. of acetyldihydromorphinone.

Acetyldihydromorphinone (50 g.), dissolved in chloroform (120 ml.), is added slowly with stirring during 20 minutes to a solution of cyanogen bromide (16.40 g.) in chloroform (50 ml.). Heat is evolved. After the initial reaction has subsided, the mixture is heated on the water-bath for 2 hours, after which the solvent is removed under reduced pressure. The residue on treatment with hot water gives crude O-acetyl - N-cyanodihydronormorphinone which is washed with hot water and then with cold water. Recrystallization from methanol gives the pure cyano-compound as yellowish prisms, M.P. 98–100° C. (efferv.).

The whole of the crude cyano-compound is heated under reflux for 4 hours with 1.66 N-hydrochloric acid, after which the mixture is allowed to stand overnight. Collection of the prisms which appear gives known dihydronormorphinone hydrochloride, M.P. 345–350° C. (decomp.). Alternatively, the whole of the reaction mixture is warmed to 40–50° C. and just sufficient water added to dissolve the solid. Aqueous ammonium hydroxide (10%) is then added until the mixture has pH 8. The precipitate is collected, washed with water and dried. Dihydronormorphinone so obtained (37.23 g.) has M.P. 305–306° C. (decomp.).

Dihydronormorphinone (25 g.), dioxan (250 ml.), water (25 ml.), and potassium carbonate (25 g.) are stirred together and cyclopropanecarbonyl chloride (18 g.) added. Stirring is continued for 20 hours at room temperature; then 2 N-sodium hydroxide (200 ml.) is added and the mixture stirred for a further 45 minutes. The mixture is extracted with ethyl acetate (4×100 ml.) to remove any cyclopropanecarboxylic ester formed, and the aqueous layer adjusted to pH 2 with 2-N-hydrochloric acid. Collection of the precipitate gives N-(cyclopropanecarbonyl)-dihydronormorphinone, M.P. 338–340° C. (decomp.).

N,N-diethylcarbamyl chloride (8 g.) is added dropwise to a solution of N-(cyclopropanecarbonyl)-dihydronormorphinone (10 g.) in dry pyridine (50 ml.), and the last traces of chloride washed in with further pyridine (10 ml.). The mixture is then heated under reflux with stirring for 4 hours, during which time all the solid initially present dissolves. The reaction mixture is cooled in ice, treated with sufficient 6 N-sulphuric acid to remove the pyridine, and extracted with chloroform (4×10 ml.). The combined chloroform extracts are washed with 2.5 N-sodium hydroxide (3×100 ml.) and with water (2×100 ml.), dried (magnesium sulphate) and evaporated, giving a brown foam.

This product is dissolved in absolute ethanol (75 ml.) containing acetic acid (7.5 g.), Girard's reagent P (6 g.) added, and the mixture heated under reflux for 1 hour. The reaction mixture is cooled and poured into ice-water (500 ml.) containing 0.5 N-sodium hydroxide (225 ml.). The aqueous mixture is extracted with ether (4×100 ml.), and the aqueous phase is then treated with 6 N-sulphuric acid (80 ml.) and set aside for 1 hour. The resulting aqueous suspension is extracted with benzene (200+2× 100 ml.), and the combined extracts are washed with water (2× 100 ml.) and with saturated aqueous sodium bicarbonate (100 ml.), dried (magnesium sulphate), and evaporated.

The residue (8.80 g.) is further purified by chromatography on alumina (type H; 150 g.); elution with benzene containing 0.3% of methanol and evaporation of the eluate give pure N-(cyclopropanecarbonyl)-O-(N',N'-diethylcarbamyl) - dihydronormorphinone as a colorless glass which subsequently crystallizes as needles on treatment with benzene and then has M.P. 176–177° C. (previous sintering at 95–100° C.).

(1) Sodium (0.363 g.) is dissolved in a mixture of dry t-butanol (92 ml.) and dry methanol (1.5 ml.) with stirring under reflux in an atmosphere of nitrogen. When all the sodium has dissolved further t-butanol (46 ml.) is added and the mixture allower to cool to room temperature. A solution of N-(cyclopropanecarbonyl)-O-(N',N'-diethylcarbamyl)-dihydronormorphinone (5.75 g.) in t-butanol (46 ml.) is then added with stirring under nitrogen, which is maintained for the remainder of the preparation. A solution of dimethyl sulphate (1.82 g.) in t-butanol (25 ml.) is then added dropwise with stirring, and the mixture stirred for 1 hour at room temperature and then for 2 hours under reflux. The bulk of the solvent is then removed under reduced pressure and residue stirred with 1.5% aqueous ammonium hydroxide (300 ml.), extracted with benzene (200+2× 100 ml.), and the combined benzene extracts washed with saturated aqueous sodium chloride (100 ml.), dried over magnesium sulphate, and evaporated. The residue (5.41 g.) is purified by chromatograph on alumina (150 g.; type H) and elution with benzene containing 0.1% of methanol. Evaporation of the eluate gives a foam (4.7 g.) which on crystallization from ether gives N-(cyclopropanecarbonyl)-O-(N',N'-dimethylcarbamyl) - Δ⁶ - dihydronororipavine, needle clusters M.P. 75–78° C.

(2) A solution of N-(cyclopropanecarbonyl)-O-(N,N'-diethylcarbamyl)-dihydronormorphinone (8.55 g.) in dry dimethyl sulphoxide (20 ml.) is stirred in an atmosphere of dry nitrogen while a solution of sodium (methylsulphinyl) - methyl in dimethyl sulphoxide (31.8 ml.; 0.632 M; prepared and standardized by the method of Corey and Chayakowski, J. Amer. Chem. Soc., 1962, 84, 866) is added, followed immediately by dropwise addition of a solution of dimethyl sulphate (2.46 g.) in dimethyl sulphoxide (7 ml.), the last traces of dimethyl sulphate being washed in with further dimethyl sulphoxide (5 ml.). Stirring under nitrogen is continued for a further 2 hours after which the bulk of the solvent is removed in vacuo (0.5 mm.). Treatment of the residue with 1.5% aqueous ammonium hydroxide (100 ml.) gives a solid which is collected, washed well with water, and dried in vacuo. This product (5.57 g.) on chromatography on alumina (120 g.; type H) and elution with benzene containing 10% of ethyl acetate, followed by evaporation of the eluate, gives a residue which then rubbed with light petroleum at 0° C. gives N-(cyclopropanecarbonyl)-O-(N',N' - diethylcarbamyl - Δ⁶ - dihydronororipavine, M.P. 76–79° C. (2.82 g.) identical (infra-red spectrum) with the product obtained by method (1). The product is recrystallized with difficulty from ethyl acetate, giving material M.P. 83–84° C.

A solution of N-(cyclopropanecarbonyl)-O-(N',N-diethylcarbamyl)-Δ⁶-dihydronororipavine (2.82 g.) in dry tetrahydrofuran (80 ml.) is added to a stirred slurry of lithium aluminum hydride (1.41 g.) in dry tetrahydrofuran (80 ml.). The mixture is stirred under reflux in an atmosphere of dry nitrogen for 3 hours, after which the mixture is cooled in ice-water and stirring continued while a mixture of ethyl acetate (14 ml.) and ether (30 ml.) is added dropwise, followed by cautious addition of a solution of disodium dihydrogen ethylenediaminetetraacetate (17.5 g.) in water (80 ml.). After addition of benzene (50 ml.) saturated aqueous sodium bicarbonate is added until the aqueous phase has pH 8. The upper phase is separated and the aqueous phase extracted with benzene (2× 100 ml.). The continued upper phases are dried over magnesium sulphate and evaporated, giving crude N-cyclopropylmethyl-Δ⁶-dihydronororipavine as a foam. A solution of this product in a mixture of ethanol (2.5 ml.) and ether (25 ml.) is treated portionwise with a solution of salicylic acid (2.50 g.) in ether (25 ml.). The mixture is gently warmed on the water-bath and then left for 1.4 hours at 0° C. after which collection gives the crude salicylate salt, M.P. 222–227° C. (decomp.). Recrystallization from ethanol gives pure N-cyclopropylmethyl-Δ⁶-dihydronororipavine salicylate, M.P. 225–227° C. (decomp.).

This material (500 mg.) is dissolved in pyridine and reacted with an excess of nicotinoyl chloride. Quenching in water gives the nicotinoyl ester.

*Example 6*

A stirred suspension of dihydronormorphinone (30 g.) in dioxan (300 ml.) is cooled in ice-water and treated successively with potassium carbonate (30 g.), water (30 ml.), and cyclobutanecarbonyl chloride (24.2 g.). The resulting mixture is stirred for 20 hours at room temperature and then treated with 2 N-sodium hydroxide (180 ml.), stirred for a further 45 minutes, and finally extracted with ether (3× 60 ml.). The aqueous phase is cooled in ice and acidified with 6 N-hydrochloric acid, and the buff colored product collected, washed with water, and dried, giving almost pure N-(cyclobutanecarbonyl)-dihydronormorphinone, M.P. 285° C. (decomp.).

The foregoing ether extracts are dried and evaporated giving an orange oil which is dissolved in a mixture of 2 N-sodium hydroxide (100 ml.) and ethanol (100 ml.) and the solution maintained at 60° C. for 1 hour in an atmosphere of nitrogen and then cooled and acidified with 6 N-hydrochloric acid, giving a further crop of the product. This material, when recrystallized by dissolution in hot chloroformethanol (1:1) followed by removal of most of the chloroform, gives the pure product as prisms, M.P. 2935° C. (decomp.), identical (infra-red spectrum) with the foregoing material.

A solution of diethylcarbamyl chloride (19.3 g.) in anhydrous pyridine (20 ml.) is added dropwise to a stirred suspension of N-(cyclobutylcarbonyl)dihydronormorphinone (25 g.) in anhydrous pyridine (125 ml.) after which the mixture is heated under reflux for 4 hours. The resulting pale brown solution is cooled in ice and treated with sufficient 6 N-sulphuric acid to dissolve the pyridine, and the mixture extracted with chloroform (150+ 2×100 ml.). The combined chloroform extracts are washed with 2 N-sodium hydroxide (100 ml.) and with water (100 ml.), dried, and evaporated. The residue is dissolved in the minimum volume of hot ethanol and the solution treated with ether until a faint turbidity appears; minute needle clusters appear on standing. Collection gives essentially pure N-(cyclobutanecarbonyl)-O-(N',N' - diethylcarbamyl)dihydronormorphinone, M.P. 172–174° C. Further, less pure material is obtained from the mother-liquors. Further recrystallization of the first crop material gives analytically pure material M.P. 173–174° C.

The compound is prepared by the same two methods as were used for the preparation of the corresponding N-cyclopropanecarbonyl derivative.

(1) N - (cyclobutanecarbonyl)-O-(N',N' - diethylcarbamyl)-dihydronormorphinone (2.26 g.) on methylation in the presence of sodium t-butoxide gives N-(cyclobutanecarbonyl)-O-(N',N'-diethylcarbamyl)-Δ⁶-dihydronororipavine as a gum.

(2) The same starting material (9.69 g.) on methylation in the presence of sodium (methylsulphinyl) methyl gives the nororipavine derivative identical infra-red spectrum with material obtained by method (1).

N - (cyclobutanecarbonyl)-O-(N',N'-diethylcarbamyl)-Δ⁶-dihydronororipavine (4.85 g.) is reduced with lithium aluminum hydride by the method used for the preparation of the corresponding N-cyclopropylmethyl derivative. Isolation gives crude N-(cyclobutylmethyl)-Δ⁶-dihydronororipavine (4.25 g.) which is converted to the salicylate salt needle-clusters M.P. 231–232° C. (decomp.) from ethanol. Alternatively trituration of the crude reduction product with ether gives the free base as an amorphous solid M.P. 103–104° C.

An aliquot of the base (200 mg.) in hot ethanol is heated on the steam bath with ethyl iodide. Cooling and trituration gives the ethiodide quaternary. Another aliquot (200 mg.) is reacted in pyridine with an excess of acetic anhydride. Quenching gives the acetate ester.

Another portion (500 mg.) in ethanol is mixed with an excess of aqueous hydrogen peroxide on the steam bath. Concentration and cooling gives the N-oxide derivative. This material (50 mg.) in ether is reacted with an equivalent quantity of methanolic hydrogen chloride at 0° C. to give the hydrochloride salt.

*Example 7*

The process of Example 1 is repeated substituting in equimolar quantities propargyl chloride for allyl bromide to give N-propargylnorthebaine. Substituting 3,3-dimethylallyl gives N-3,3-dimethylallylnorthebaine. 3,3-dichloroallyl bromide substituted in Example 4 using sodium bicarbonate in ethanol give 3,3-dichloroallylnorthebaine. Substituting cyclopentylcarbonyl chloride or cyclohexylcarbonyl chloride for the cyclopropylcarbonyl chloride of Example 5 gives N-cyclopentylmethyl or N-cyclohexylmethyl-Δ⁶-dihydronororipavine.

*Example 8*

A solution of dihydromorphinone base (46.0 g.) in dry pyridine (230 ml.) is stirred with diethylcarbamyl chloride (43.7 g.) is added slowly. The resulting mixture is stirred under reflux for 3 hours, after which the solvent is removed under reduced pressure. The syrupy residue is taken up in warm water (150 ml.) and the solution concentrated to 100 ml. under reduced pressure, treated with charcoal at the boiling point, filtered, and the filtrate cooled and made alkaline with 10 N-sodium hydroxide (30 ml.). The oily suspension is extracted with benzene (100+ 2× 50 ml.) and the combined benzene extracts are washed with saturated aqueous sodium chloride (50 ml.), dried over magnesium sulphate (with charcoal), and evaporated. The resulting oil is treated with light petroleum (200 ml.) and left overnight at 0° C. The crystalline mass so obtained is broken up and the solid collected, washed with 1:1 ether—light petroleum, and dried. The product has M.P. 122–124° C.; recrystallization from ethyl acetate gives pure N',N'-diethylcarbamyldihydromorphinone as straw-colored prisms, M.P. 124.5–125.5° C.

A solution of N',N'-diethylcarbamyldihydromorphinone (35.0 g.) in chloroform (100 ml.) is then added dropwise with stirring to a solution of cyanogen bromide (9.72 g.) in chloroform (25 ml.). Heat is evolved during the addition, which takes 40 minutes. When addition is complete, the mixture is stirred under gentle reflux for 2 hours and then evaporated under reduced pressure. The residue is mixed with ethanol (50 ml.), and re-evaporated under reduced pressure, giving a syrup which begins to crystallize. This product solidifies completely on treatment with warm water (100 ml.); the solid is collected, washed with hot water, and dried, giving N-cyano-O(N',N' - diethylcarbamyl)dihydronormorphinone, M.P. 165–168° C. Recrystallization from ethanol gives felted needles, M.P. 190–192° C. with sintering at 170° C.

A mixture of N-cyano-O(N',N'-diethylcarbamyl)dihydronormorphinone (29.1 g.) and 2 N-hydrochloric acid (500 ml.) is stirred under reflux for 4 hours. The resulting clear yellow solution is allowed to stand overnight at room temperature, then stirred with charcoal, filtered, and the filtrate made alkaline with 10 N-sodium hydroxide (150 ml.). The oily suspension is extracted with ethyl acetate (3× 250 ml.) and the combined extracts washed with 2 N-sodium hydroxide (100 ml.) and with saturated aqueous sodium chloride (100 ml.), dried over magnesium sulphate with charcoal, and evaporated, giving O(N',N' - diethylcarbamyl)dihydronormorphinone as a cream colored foam.

A mixture of O(N',N'-diethylcarbamyl)dihydronormorphinone (2.96 g.), 1-bromo-3-methyl-2-butene (1.20 g.), sodium bicarbonate (1.01 g.), and N,N-dimethylformamide (25 ml.) is stirred under reflux for 5 hours. The mixture is then cooled and the solids separated using a filtration aid and washed with ethanol. The filtrate and washings on evaporation under reduced pressure give a dark brown oil which dissolves slowly on addition of 2 N-hydrochloric acid (50 ml.). The resulting brown, turbid solution is treated with charcoal, filtered using a filtration aid, and the pale orange filtrate extracted with ether (3× 50 ml.). The aqueous phase is made alkaline with an excess of concentrated aqueous ammonium hydroxide and the oily suspension extracted with ether (3× 25 ml.). The combined ethereal phases from this second extraction are dried over magnesium sulphate with added charcoal and evaporated to give O(N',N'-diethylcarbamyl)-N(3,3-dimethylallyl)dihydronormorphinone (2.14 g.) as a pale yellow foam. A portion of this product (2.03 g.) is dissolved in ethanol (10 ml.) and the solution added dropwise with shaking to a solution of (+)-tartaric acid (1.02 g.) in ethanol (10 ml.). A gelatinous precipitate appears at first but redissolves on warming; on scratching and cooling the acid tartrate appears as needles, M.P. 152–154° C. An aqueous solution of the acid tartrate (1.95 g. in 20 ml.) on treatment with an excess of concentrated aqueous ammonium hydroxide gives pure O(N',N' - diethylcarbamyl)-N-(3,3-dimethylallyl)-dihydronormorphinone as a granular solid, M.P. 62° C. (unsharp).

O(N',N' - diethylcarbamyl)-N(3,3-dimethylallyl)dihydronormorphinone (5.50 g.) on methylation in the presence of sodium (methylsulphinyl)methyl (by the method and for the preparation of the corresponding N-cyclopropanecarbonyl derivative) gives O(N',N'-diethylcarbamyl)-N(3,3-dimethylallyl)-Δ⁶-dihydronororipavine.

O(N',N'-diethylcarbamyl)-N(3,3-dimethylallyl)-Δ⁶ - dihydronororipavine (2.50 g.) is reduced with lithium aluminum hydride by the method used for the preparation of the corresponding N-cyclopropylmethyl derivative. Isolation gives crude N(3,3-dimethylallyl)-Δ⁶-dihydronororipavine which is purified by conversion to the salicylate salt (2.0 g.). A solution of the salicylate salt (1.0 g.) in N-sodium hydroxide (15 ml.) when saturated with carbon dioxide gives pure N(3,3-dimethylallyl)-Δ⁶-dihydronororipavine base.

Example 9

N(3,3-dimethylallyl)-Δ⁶ - dihydronororipavine (0.5 g.) when treated with nicotinoyl chloride in the presence of pyridine (according to the method used in the preparation of N-cyclobutylmethyl-O-nicotinoyl - Δ⁶ - dihydronororipavine) gives N(3,3-dimethylallyl)-O-nicotinoyl-Δ⁶-dihydronororipavine which on treatment with one mole equivalent of hydrobromic acid in methanol at 0° C. gives the hydrobromide salt.

Example 10

N-cyclobutylmethyl-Δ⁶-dihydronororipavine (0.50 g.) is added to a solution of nicotinoyl chloride hydrochloride (0.52 g.) in dry pyridine (6 ml.). Some heat is evolved and a clear orange solution results. This solution is stirred at room temperature for 3 days, after which ether (50 ml.) is added and the ethereal solution washed with saturated aqueous sodium carbonate (5× 20 ml.) and with water (2× 25 ml.), dried over magnesium sulphate, and evaporated, giving the crude nicotinoyl ester. A portion of this crude product (0.42 g.) in ethanol (5 ml.) is cooled to 0° C. and stirred while a mixture of 3.734 N-hydrobromic acid (0.20 ml.) and ethanol (5 ml.) is added dropwise. The resulting solution is diluted with benzene and evaporated under reduced pressure. The residue on treatment with ether gives the crude hydrobromide salt of the nicotinoyl ester as a buff-colored solid. Recrystallization from isopropanol gives N-cyclobutylmethyl-O-nicotinoyl-Δ⁶ - dihydronororipavine hydrobrimed as needles, M.P. 254–255° C.

Example 11

N-allyldihydronorcodeinone [prepared by the method of Clark, Pessolano, Weijlard, and Pfister, J. Amer. Chem. Soc., 1953, 75, 4963] (10.23 g.) is methylated by the same method as that used in the preparation of N-(cyclopropanecarbonyl)-Δ⁶ - dihydronorthebaine. After chromatography on alumina the product is obtained as an oil which on crystallization from light petroleum gives pure N-allyl-Δ⁶-dihydronorthebaine as cubes, M.P. 63–64° C. A portion of this product (1.60 g.) is dissolved in methanol (80 ml.) and the solution stirred at 0° C. while a mixture of 3.734 N-hydrobromic acid (1.305 ml.) and methanol (20 ml.) is added dropwise. The resulting solution is evaporated at 30° C. under reduced pressure and the residue treated with ether, giving the crystalline hydrobromide salt, M.P. 259–260° C. (dec.). Recrystallization from ethanol-ether gives N-allyl-Δ⁶-dihydronorthebaine hydrobromide as needles, M.P. 260–261° C. (dec.).

Example 12

N-(cyclopropanecarbonyl)-O(N',N'-diethylcarbamyl)-Δ⁶-dihydronororipavine (4.53 g.) on treatment with methyl hypobromite (by the method used in the preparation of 7-bromo - N - cyclopropylmethyldihydronorcodeinone dimethyl ketal) gives 7-bromo-N-(cyclopropanecarbonyl)-O(N',N' - diethylcarbamyl)dihydronormorphinone dimethyl ketal.

7-bromo-N-(cyclopropanecarbonyl)-O(N',N' - diethylcarbamyl)dihydronormorphinone dimethyl ketal (1.4 g.) on dehydrobromination (by the method used in the preparation of norcodeinone dimethyl ketal) gives N-(cyclopropanecarbonyl) - O(N',N' - dimethylcarbamyl)normorphinone dimethyl ketal.

N-(cyclopropanecarbonyl)-O(N',N'-diethylcarbamyl)-normorphinone dimethyl ketal (2.4 g.) is dissolved in dry tetrahydrofuran (60 ml.) and the solution added to a stirred slurry of lithium aluminum hydride (1.2 g.) in dry tetrahydrofuran (60 ml.). The mixture is then stirred under reflux in an atmosphere of nitrogen for 3 hours. At the end of the reaction period the mixture is cooled in ice, and decomposed by addition of a mixture of ethyl acetate (12 ml.) and ether (30 ml.), followed by cautious addition of a solution of disodium dihydrogen ethyldiamine-tetra-acetate (15 g.) in water (70 ml.). After addition of benzene (50 ml.) saturated aqueous sodium bicarbonate is added until the aqueous phase has pH 8. The upper phase is then separated and hte aqueous phase extracted with benzene (2× 100 ml.). The combined upper phases are dried over magnesium sulphate and evaporated, giving N - cyclopropylmethylnormorphinone dimethyl ketal.

N-cyclopropylmethylnormorphinone dimethyl ketal (2.0 g.) is treated with anhydrous toluene-p-sulphonic acid in chloroform solution (by the method used in the preparation of N-cyclopropylmethylnorthebaine). The crude reaction product (2.1 g.) is dissolved in dry pyridine (20 ml.) and the solution cooled to 0° C. and stirred while a mixture of acetic anhydride (4 ml.) and dry pyridine (6 ml.) is added dropwise. The mixture is kept at room temperature for 24 hours, then poured into saturated aqueous sodium bicarbonate (100 ml.). The mixture is extracted with chloroform (3× 30 ml.) and the combined chloroform extracts are washed with saturated aqueous sodium bicarbonate (3× 25 ml.), dried over magnesium sulphate, and evaporated. The residue (2.3 g.) is subjected to chromatography on alumina (45 g.; type H); elution with benzene and evaporation of the eluate gave O-acetyl-N-cyclopropylmethylnororipavine.

A solution of O-acetyl - N - cyclopropylmethylnororipavine (0.70 g.) in 1:3 acetone-methanol mixture (100 ml.) is stirred under nitrogen while 2 N-sodium hydroxide (10.0 ml.) is added dropwise. Stirring is continued for 5 hours at room temperature, after which the reaction mixture is concentrated under reduced pressure at 30° C. and the aqueous residue diluted with water (10 ml.) and extrated with ether (3× 20 ml.). The aqueous phase is saturated with carbon dioxide and the resulting mixture extracted with chloroform (3× 24 ml.). The combined chloroform extracts are dried over magnesium sulphate and evaporated, giving N-cyclopropylmethylnororipavine.

A portion (0.3 g.) of the base on treatment with an excess of salicylic acid in ethanol solution gives N-cyclopropylmethylnororipavine salicylate.

What is claimed is:
1. A chemical compound of the structure:

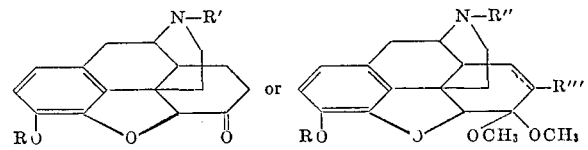

in which R is hydrogen, methyl or diethylcarbamyl; R' is cyano, cyclopropylcarbonyl, cyclobutylcarbonyl, tert.-butoxycarbonyl, benzyloxycarbonyl or, when R is diethylcarbamyl, hydrogen; R" is cyclopropylmethyl, cyclopropylcarbonyl, cyclobutylmethyl, cyclobutylcarbonyl, benzyloxycarbonyl or tert.-butoxycarbonyl; and R''' is, when —— is a double bond, hydrogen or, when —— is a single bond, bromo.

2. A chemical compound of the structure of claim 1 in which R is methyl or diethylcarbamyl, R" is hydrogen, R''' is hydrogen and —— is a double bond.

3. A chemical compound of the structure of claim 1 in which R is methyl or diethylcarbamyl, R" is hydrogen, R''' is bromo and —— is a single bond.

4. A chemical compound of the structure of claim 1 in which R is diethylcarbamyl and R' is hydrogen.

5. A chemical compound of the structure of claim 1 in which R is methyl and R' is tert.-butoxycarbonyl, said compound being N-(tert.-butoxycarbonyl)-dihydronorcodeinone.

6. A chemical compound of the structure of claim 1 in which R is methyl and R' is benzyloxycarbonyl, said compound being N-(benzyloxycarbonyl)-dihydronorcodeinone.

7. A chemical compound of the structure of claim 1 in which R is methyl and R' is cyclopropylcarbonyl, said compound being N-cyclopropylcarbonyldihydronorcodeinone.

8. A chemical compound of the structure of claim 1 in which R is hydrogen, and R' is cyclopropylcarbonyl, said compound being N-cyclopropylcarbonyldihydronormorphine.

No references cited.

ALEX MAZEL, *Primary Examiner.*

DONALD G. DAUS, *Assistant Examiner.*